United States Patent Office 2,825,717
Patented Mar. 4, 1958

2,825,717

DIALKYL FUMARATE-VINYL ACETATE COPOLYMERS

Edward P. Cashman, Bayonne, N. J., Ethel J. Corcoran (Guzy), New York, N. Y., and Raymond M. Dean, Westfield, N. J., assignors to Esso Research and Engineering Company, a corporation of Delaware No Drawing. Application May 6, 1954, Serial No. 428,122

3 Claims. (Cl. 260—78.5)

This invention relates to a process for the preparation of lubricating oil additive materials and the products prepared thereby. Particularly the invention relates to an improved process for the preparation of pour point depressing additive materials for combination with waxy mineral lubricating oils. More particularly the invention relates to an improved process for the preparation of pour point depressing lubricating oil additive materials by copolymerizing an ester of an unsaturated polycarboxylic acid prepared in the presence of a mild esterification catalyst with a second polymerizable material in the presence of a peroxide catalyst in an alkaline medium.

The art of lubricating oil additive manufacture has long been familiar with the preparation of polymers and copolymers to form materials useful for improving desirable characteristics of lubricating oils. Of particular interest in recent years has been the development of additive materials for improving the viscosity index, that is, for reducing the rate of change of viscosity of an oil with a change in temperature, and for improving the pour point of a lubricating oil, that is lowering the temperature at which the lubricating oil loses its property of free flow. Such materials as polymers and copolymers of acrylate esters, polymers and copolymers of alpha-beta unsaturated polycarboxylic acid esters, etc., have been found to be very satisfactory for many purposes. It has also been found, however, that the preparation of these polymers and copolymers presents many technical difficulties. Foremost among these difficulties is the problem of odor and color degradation experienced, particularly in copolymers of acid esters with other polymerizable materials. Although many theories have been advanced to explain the formation of the undesirable color and odor bodies, the exact cause of this phenomenon is not known.

It has now been found, however, and forms the object of this invention, that copolymers having outstanding utility as lubricant additives may be prepared by a process which eliminates the formation of undesirable odor and color degrading materials without harming the improving characteristics of the additive materials.

Briefly stated, the improved process comprises the steps of preparing polycarboxylic acid esters in the presence of a mild esterification catalyst and copolymerizing the acid esters so formed with other polymerizable materials in the presence of a peroxide catalyst and in an alkaline medium.

The improved process of this invention is applicable to the polymers or copolymers of esters in general. It has particular advantage, however, when applied to the copolymerization of unsaturated polycarboxylic acid esters with other polymerizable monomeric materials.

Use of peroxide copolymeric catalysts is known in the art. Ordinarily these catalysts are used in neutral or acidic media. So far as is known, this is the first disclosure of the use of a peroxide catalyst in an alkaline medium, the advantages obtained being pointed out in detail below.

The unsaturated polycarboxylic acid esters may be represented by the following formula

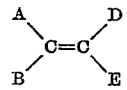

wherein (1) A and D are carboxylic acid ester groups

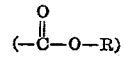

and B and E are hydrogen, e. g., fumaric acid esters, maleic acid esters, etc., or (2) A and D are carboxylic acid ester groups, as above, and either B or E is a methyl group, the other being hydrogen, e. g., citraconic acid esters, mesaconic acid esters, etc., or (3) A and B are hydrogen, D is a carboxylic acid ester group and E is a methylene carboxylic acid ester group, e. g., itaconic acid esters, or (4) A and D are carboxylic acid ester groups as above, E is a methylene carboxylic acid ester group and B is hydrogen, e. g., aconitic acid esters.

It will be noted that the unsaturation in all of these compounds is alpha-beta to at least one carboxy group. Although any of the polycarboxylic acid esters, according to the formula above, or mixtures of such polycarboxylic acid esters, are operable in the process of this invention, the fumaric acid esters and maleic acid esters are particularly advantageous. Mixtures of two or more of such unsaturated polycarboxylic acid esters in varying proportions, i. e., 10–90 parts fumaric and 90–10 parts maleic ester, may be used in place of only one ester.

The esters may be prepared by esterification of any of the unsaturated polycarboxylic acids or their corresponding anhydrides with which the art is familiar.

The alcohols used in preparing the esters of the polycarboxylic acids or their anhydrides are selected from the $C_1$ to $C_{18}$ aliphatic alcohols. Primary alcohols are preferred over secondary and tertiary alcohols, although secondary alcohols are sometimes suitable. The alcohols are preferably saturated, although some degree of unsaturation is permissible when mixtures of alcohols are employed. Straight chain or lightly branched alcohols are preferred over highly branched alcohols.

In the alcohols selected for preparing the esters, there should be sufficient hydrocarbon content to insure solubility of the final polymer products in lubricating oils, which in the case of most oils requires that the alcohols have on the average at least about 7.5 carbon atoms per molecule. When employing single alcohols those ranging from $C_8$ to $C_{18}$ are suitable. When mixtures of alcohols are employed, those ranging from $C_1$ to $C_{18}$ can be used in such proportions that the average is about $C_{7.5}$ or greater.

In general, the products prepared according to the invention are both pour point depressants and viscosity index improvers. However, for optimum potency it is usually desirable to select the alcohols used in preparing the esters so that the product will be primarily a pour point depressant or primarily a viscosity index improver. For optimum pour depressing potency in a wide variety of mineral lubricating oils the alcohols should have on the average about 11 to about 15, preferably 11.5 to 14, carbon atoms per molecule. For optimum potency as a viscosity index improver, the alcohols should have on the average about 7.5 to 11, preferably 8 to 10, carbon atoms per molecule. Exceptions are sometimes found; for example, products prepared from relatively short chain alcohols are good pour depressants in relatively light oils such as those employed as hydraulic fluids and power transmission fluids. For potent pour depressants, alcohols having long straight chains are greatly preferred. Some branching in some of the alcohols is permissible, for example, mixed 2-ethylhexyl and cetyl alcohols are suitable, but a highly branched $C_{13}$ alcohol is entirely unsuitable for the production of pour point depressants unless employed with other alcohols having relatively long straight chains.

Among the alcohols that may be mentioned specifically as having utility in this invention are octyl, isooctyl, 2-ethylhexyl, nonyl, 2,2,4,4-tetramethylamyl, decyl, dodecyl, tetradecyl, cetyl, and stearyl alcohols. Mixtures of the above are operable so long as the components of the mixture are adjusted so that the average number of carbon atoms of the mixture is between 8 and about 18 carbon atoms. Thus, methyl alcohol may be admixed with stearyl alcohol to obtain a mixture having an average side chain length within the desired range.

One especially desirable mixture of alcohols operable in this invention is the commercially available mixture known as "Lorol-7" alcohol and obtained by hydrogenation and refining of coconut oil. The distribution of the alcohols of this mixture and other commercially available alcohols are shown in the following table:

COCONUT OIL ALCOHOL CARBON CONTENT

|  | Lorol | Lorol 5 | Lorol 7 |
| --- | --- | --- | --- |
| Decyl | 4 | 2.6 | 2.5 |
| Lauryl | 55 | 61.0 | 55.5 |
| Tetradecyl | 22 | 23.0 | 21.0 |
| Hexadecyl | 14 | 11.2 | 10.2 |
| Octadecyl | 4 | 2.2 | 10.8 |
| Ave. No. Carbon Atoms | 12.8 | 13.0 | 13.4 |

The process of the instant invention contemplates the copolymerization of the polycarboxylic acid esters as described above with other polymerizable monomeric materials. These monomers may be represented by the following formula:

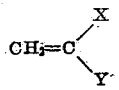

wherein (1) X is hydrogen and Y is an ester group

R being methyl, ethyl, butyl and the like) e. g., vinyl acetate, vinyl butyrate and the like; or (2) X is methyl, ethyl, etc., and Y is as described above, e. g., isopropenyl acetate, etc., or (3) X is a halogen and Y is as described above, e. g., alpha-chlorovinyl acetate, etc., or (4) X is a hydrogen or methyl and Y is an aromatic group, e. g., styrene, alpha-methyl styrene, and the like, or (5) X is hydrogen of methyl and Y is $-C \equiv N$, e. g., acrylonitrile, etc.

Although any of the polymerizable monomeric materials typified by the formula above are operable to form useful copolymers with the polycarboxylic acid esters outlined above, the preferred embodiment contemplates the use of vinyl compounds, particularly vinyl esters and their substitution products. Vinyl fatty acid esters containing from about 2 to about 18 carbons are particularly operable, such as vinyl acetate, vinyl propionate, vinyl butyrate, vinyl laurate, vinyl stearate and the like. Mixtures of such vinyl esters, e. g., 10-90 parts of vinyl acetate and 90-10 parts of isopropenyl acetate, may be used in place of a relatively pure vinyl ester. Vinyl acetate is particularly preferred.

As was stated briefly above, the instant invention relates to a process for the preparation of copolymeric additive materials and the materials per se. The gist of the invention involves preparation of the materials; (1) the esterification of the polycarboxylic acid with a mild esterification agent and (2) the copolymerization of the polycarboxylic acid esters with other polymerizable materials in alkaline media.

In the preparation of the ester of the polycarboxylic acids, according to the instant invention, the ordinary acidic catalyst, such as sulfuric acid, is replaced with a mild esterification catalyst such as sodium acid sulfate, phosphoric acid, p-toluene sulfonic acid and the like. Sodium acid sulfate is preferred. This esterification step is generally carried out in the presence of a water entrainer, such as heptane, naphtha, benzol, xylol and the like. From about 1.8 to about 2.5 mols of the esterification agent is added per mol of the polycarboxylic acid and the reactants are refluxed at a temperature of about 200° to 300° F. for a period of time sufficient to reduce the neutralization number of the reaction mixture to below about 5.0. Ordinarily this takes from about 2 to 10 hours. The water entrainer may then be stripped from the mixture by distillation under vacuum and the ester recovered.

The second step of the inventive process involves the copolymerization of the monomer prepared as generally described above with a second polymerizable material, preferably the $C_2$–$C_{18}$ esters of fatty acids exemplified by vinyl acetate. In prior art processes, this copolymerization has been carried out with the aid of various polymerization catalysts of the peroxide type. In the instant process these same general types of catalysts are used. According to the invention they are used in an alkaline medium—or in the presence of an alkaline reacting material exemplified by such materials as sodium carbonate, barium hydroxide, lime, sodium hydroxide and the like.

Depending upon the desired product, the monomers in the copolymerization reaction utilizing the process of invention may be varied greatly. However, when a copolymer of a polycarboxylic acid ester and vinyl acetate is being prepared, it is desirable that from 2% to 40% of vinyl acetate, preferably 10% to 25%, be used with the polycarboxylic acid ester. A copolymer of 80% dicarboxylic acid ester with 20% vinyl acetate has outstanding pour depressant qualities.

The process of the instant invention may be applied to any of the well known polymerization techniques. For instance, the bulk polymerization technique wherein the catalyst used is added directly to the mixture of the monomers alone may be used applying the process of invention. If it is desired, the solution polymerization technique may be utilized, that is, the technique in which the monomers are polymerized in solution in a solvent, for example, naphtha, lubricating oil fractions, white oils, benzene, toluene and other petroleum hydrocarbons, as well as esters, ethers and chlorinated solvents such as chloroform, carbon tetrachloride, etc. When the solution polymerization technique is used, it is preferred that the monomer concentration in the diluent range from 30% to 99% by weight, based on the weight of the total mixture. The suspension technique of polymerization or the emulsion polymerization technique wherein an emulsifying agent such as a soap is used to form an emulsion of the monomers and water and a water soluble catalyst is utilized may also be adapted to the process of invention with excellent results.

The reaction conditions to be experienced in the copolymerization may also be varied within wide ranges. In the preferred embodiment, the copolymerization of polycarboxylic acid esters with other polymerizable materials, it is preferred that temperatures within a range of from room temperature to 250° F., preferably 100° F. to 200° F., be utilized. In most instances, it will be found advantageous to utilize from 0.05% to 3% by weight, based on the weight of the monomers, of a peroxide catalyst, with 0.1% to 2.0% by weight being preferred. The peroxide catalysts may be added at the start of the reaction, in small portions at the early stage of the reaction, or during the entire course of the reaction. In general, milder copolymerization conditions are obtained with lesser amounts of catalyst or if the catalyst is added in small portions during copolymerization. Among the operable catalysts are hydrogen peroxide, benzoyl peroxide, cumene hydroperoxide, potassium persulfate, lauroyl peroxide, ammonium persulfate, urea hydroperoxide, tertiary butyl hydroperoxide, tertiary butyl perbenzoate and the like, benzoyl peroxide being used in the preferred embodiment. Reduction-oxidation activators known by the name of "Redox," for example, benzoin and ferric laurate, may be used if desired.

The time of the reaction may vary from 1 to 50 hours, with from 3 to 24 hours being generally sufficient.

As was stated above, the prior art processes concerned with the preparation of polycarboxylic acid esters teach that an acidic catalyst, preferably a strongly acidic catalyst such as sulfuric acid is used to aid in the ester formation. With the instant invention the use of a mild esterification catalyst with or without a water wash of the resultant ester, followed by the copolymerization of the monomers in the presence of a peroxide catalyst in alkaline media, practically eliminates the color and odor degradation of the material on storage. As will be pointed out more in detail below, use of a sulfuric acid catalyst followed by water washing, or use of a mild catalyst without polymerization in alkaline media does not give the highly stable products desired, and obtainable with the inventive process.

A second advantage of the invention is that according to this procedure, less of the peroxide catalyst is used in the polymerization step with obvious advantages.

The invention will be more clearly explained by reference to the following illustrative examples.

Example 1

Lorol 7 fumarate was prepared from the following reactants:

108 lbs. Lorol 7 alcohol (2.15 mols)
28 lbs. fumaric acid (1.0 mol)
315 gms. sulfuric acid (catalyst)
40 lbs. heptane (water carrier)

The reactants were refluxed at 250–260° F. and the water of esterification was separated and withdrawn from the reflux stream. When the neutralization number of the reaction mixture was less than 5.0, the heptane was stripped at 250–260° F. under vacuum (50 mm. Hg).

One hundred twenty (120) lbs. of the resultant product was mixed with 29.5 lbs. of vinyl acetate (distilled to remove commercial stabilizers) and the temperature adjusted to 155–160° F. A total of 840 gms. of benzoyl peroxide catalyst were added in 5 equal portions over 5 hours during which time the temperature was permitted to rise to 170° F. The copolymerization was continued for an additional 5 hours at 170° F. Forty-six (46) lbs. of oil were added to the reaction mixture in order to stop copolymerization.

Example 2

Lorol 7 fumarate was prepared from the following reactants:

108 lbs. Lorol 7 alcohol (2.15 mols)
28 lbs. fumaric acid (1.0 mol)
211 gms. sodium bisulfate (catalyst)
40 lbs. heptane (water carrier)

The ester was prepared in the same manner as in Example 1 except that an esterification temperature of 290–300° F. was used.

One hundred twenty (120) lbs. of the resultant product was mixed with 29.5 lbs. of vinyl acetate (distilled to remove commercial stabilizers) and the temperature adjusted to 155–160° F. Three hundred thirty-six (336) gms. of benzoyl peroxide were added in 2 equal portions over 2 hours and the temperature permitted to rise to 168° F. The copolymerization was continued for an additional 8 hours at 168° F. Forty-six (46) lbs. of oil were added in order to stop the copolymerization reaction.

Example 3

Lorol 7 fumarate was prepared from the following reactants:

208 lbs. Lorol 7 alcohol (2.13 mols)
54.5 lbs. fumaric acid (1.0 mol)
635 gms. sulfuric acid (catalyst)
110 lbs. heptane (water carrier)

The esterification was carried out in a manner similar to the procedure of Example 1. When the neutralization number of the reaction mixture was less than 5.0, the temperature was reduced to 150° F. Ten gallons of water were added. After agitation and settling, the water was drawn off and the heptane stripped at 250–260° F. under vacuum (50 mm. Hg).

Two hundred thirty-two (232) lbs. of resultant product were mixed with 54 lbs. of vinyl acetate (distilled to remove commercial stabilizers) and the temperature adjusted to 155–160° F. 6.4 lbs of benzoyl peroxide were added in 13 portions over 12 hours, while maintaining the temperature between 160–170° F. The reaction was stopped by adding oil to the copolymerization mixture after 13 hours' total reaction time.

Example 4 (#19–915)

Lorol 7 fumarate was prepared from the following reactants:

108 lbs. Lorol 7 alcohol (2.15 mols)
28 lbs. fumaric acid (1.0 mol)
318 gms. sodium bisulfate monohydrate (catalyst)
40 lbs. heptane (water carrier)

The esterification was carried out in the same manner as Example 1, except that a temperature of 270–280° F. was used. When the neutralization number was less than 5.0, the temperature was reduced to 150° F. Three (3) gallons of water were added. After agitation and settling, the water was drawn off and the heptane stripped at 250–260° F. under vacuum (50 mm. Hg).

One hundred twenty-eight (128) lbs. of the resultant product was mixed with 29.5 lbs. of vinyl acetate (containing commercial stabilizer) and the temperature adjusted to 155–160° F. One hundred ninety-two (192) gms. of benzoyl peroxide were added in 3 portions over 3 hours while permitting the temperature to rise to 168° F. The copolymerization was continued for an additional 5 hours at 168–170° F. Forty-six (46) lbs. of oil were added in order to stop the reaction.

Example 5

Lorol B fumarate was prepared from the following reactants:

435.8 gms. Lorol 7 alcohol (2.15 mols)
116.0 gms. fumaric acid (1.0 mol)
2.9 gms. sulfuric acid (catalyst)
160.0 gms. heptane (water carrier)

The esterification was carried out in the same manner as in Example 1, except that a temperature of 260–280° F. was used Five hundred six (506) gms. of the resultant product were mixed with 121 gms. of vinyl acetate and 2.0 gms. of sodium carbonate. 19.6 gms. of benzoyl peroxide were added in 7 portions over 18 hours at 160–180° F.

Example 6

Lorol 7 fumarate was prepared from the following reactants:

108 lbs. Lorol 7 alcohol (2.15 mols)
28 lbs. fumaric acid (1.0 mol)
318 gms. sodium bisulfate monohydrate (catalyst)
40 lbs. heptane (water carrier)

The esterification was carried out in the same manner as in Example 1, except that a temperature of 270°–280° F. was used.

One hundred twenty-eight (128) lbs. of the resultant product were mixed with 29 lbs. of vinyl acetate (containing commercial stabilizer) and the temperature adjusted to 155–160° F. One hundred eighty-three (183) gms. of sodium carbonate were added. Seventy-two (72) gms. of benzoyl peroxide were added in 2 portions in one hour permitting the temperature to rise to 164° F. The copolymerization was continued for an additional 11 hours at 160–170° F. Forty-six (46) lbs. of oil were added in order to stop copolymerization.

Example 7

Lorol 7 fumarate was prepared as in Example 4. One hundred twenty-eight (128) lbs. of the resultant product were mixed with 29 lbs. of vinyl acetate (containing commercial stabilizer) and the temperature adjusted to 155–160° F. Three hundred sixty (360) gms. of barium hydroxide pentahydrate were added. One hundred sixty-four (164) gms. of benzoyl peroxide were added in 3 portions over 3 hours permitting the temperature to rise to 168° F. The copolymerization was continued for an additional 2¾ hours at 165–170° F. Forty-six (46) lbs. of oil were added in order to stop the reaction.

The materials prepared in the above examples were blended to 20.0% concentration in an SAE 20 grade base oil. These blends were then submitted to the standard viscosity determinations according to ASTM procedure. They were also tested for color in the Tag-Robinson color test according to known procedures and examined for their odor characteristics. The blends were then stored at 160° F. for a considerable period of time and the color and odor test repeated. The ASTM pour depressing potency was then measured in accordance with known procedures. The data obtained are set out in Table I below.

An examination of the data of Table I above will point out the advantages of the process of the invention.

It will be seen that the pour depressing potency of all the materials are substantially equivalent, although generally somewhat higher, with the materials prepared in accordance with the invention. Example 1 is an example of the prior art, that is the monomeric acid ester was prepared using sulfuric acid esterification catalyst and without a water washing step. Example 2 is different from Example 1 in that a mild esterification catalyst, sodium acid sulfate, was used. Sulfuric acid was again used in Example 3 but with a water washing step, and Example 4 illustrates the advantages received with both the mild esterification catalyst and the water washing step. In Example 5 sulfuric acid was used as the esterification catalyst and the copolymerization was carried out in the presence of a basic material, sodium carbonate. Examples 6 and 7 are prepared in accordance with the instant invention. The esterification was carried out in the presence of a mild esterification catalyst, and the copolymerization was accomplished with a peroxide catalyst in the presence of a basic material. An examination of the data of the table shows that best results as to odor and color are achieved by the use of a mild esterification catalyst followed by copolymerization in the presence of a basic material.

To summarize briefly, this invention relates to an improved process for the preparation of multifunctional lubricating oil additive materials. The improved processes which improve the color and odor stability of the copolymers comprise the steps of esterifying materials of the class of alpha-beta unsaturated polycarboxylic acids and their anhydrides, preferably dicarboxylic acids, with a long chain aliphatic alcohol, preferably one having from 8 to 18 carbon atoms per molecule. The esterification catalyst used for this step of the process is a mild catalyst such as sodium acid sulfate, p-toluene sulphonic acid, phosphoric acid and the like. After the esterification step, the ester is polymerized with a low molecular weight vinyl compound, preferably vinyl ester having from 2 to 18 carbons atoms in the alkyl group thereof. This copolymerization step is carried out in the presence of an alkaline agent which is preferably a basic material such as sodium carbonate, calcium hydroxide, barium hydroxide, sodium hydroxide and the like. Ordinarily from 98% to 60% of the acid ester will be copolymerized with

TABLE I

[Inspection data on blends of 20 wt. percent copolymer in SAE 20 grade base oil.]

| Preparation | Example 1 | Example 2 | Example 3 | Example 4 | Example 5 | Example 6 | Example 7 |
|---|---|---|---|---|---|---|---|
| Esterification Catalyst | Strong | Mild | Strong | Mild | Strong | Mild | Mild. |
| Waterwash of Ester | No | No | Yes | Yes | No | No | No. |
| Alkaline Media for Copolymerization | No | No | No | No | Yes | Yes | Yes. |
| *Inspection* | | | | | | | |
| Viscosity, SSU @ 210° F | 127.3 | 118 | 102.2 | 115.0 | 88 | 155.3 | 198.3. |
| Robinson Color | 1¼ | 5½ | 1¼ | 9¼ | 3⅛ | 10 | 10¼. |
| Odor Type | sharp, pungent vinyl acetate acetic acid. | vinyl acetate, sweet, oily. | vinyl acetate acetic acid. | slt. vinyl acetate, sweet, oily. | sharp, pungent vinyl acetate acetic acid. | vinyl acetate, sweet, oily. | vinyl acetate, sweet, oily. |
| Days Storage @ 160° F | 24 | 14 | 14 | 14 | 14 | 27 | 14. |
| Rob. Color after Storage | ⅛ | 2¾ | ⅛ | 9¼ | ½ | 9¾ | 7¼. |
| Odor Type after Storage | sharp, pungent vinyl acetate strong acetic acid. | vinyl acetate acetic acid sharp. | sharp, pungent vinyl acetate strong acetic acid. | slt. vinyl acetate, sweet, oily. | sharp, pungent vinyl acetate acetic acid. | vinyl acetate, sweet, oily. | vinyl acetate, sweet, oily. |
| ASTM Pour Potency: | | | | | | | |
| Percent in "A" Test Oil [1]— | | | | | | | |
| 0.6 | −20 | −20 | −20 | −25 | −20 | −20 | −20. |
| 0.3 | −15 | −15 | −15 | −20 | −15 | −15 | −15. |
| 0.15 | −5 | −10 | −5 | −10 | −10 | −10 | −5. |
| Percent in "B" Test Oil [2]— | | | | | | | |
| 0.4 | −20 | −20 | −15 | −20 | −20 | −20 | −20. |
| 0.2 | −15 | −10 | −10 | −10 | −10 | −20 | −15. |
| 0.1 | −5 | 0 | +20 | 0 | +15 | −10 | −10. |

[1] Acid treated paraffin distillate of a viscosity of 44.2 SSU @ 210° F.
[2] 50% "A" Test Oil; 50% Penn. Bright Stock of a viscosity of 150 SSU @ 210° F.

2% to 40% by weight of the low molecular weight vinyl compound. From 0.2 to 2.0% by weight of benzoyl peroxide catalyst is used and from 0.4% to 1.5% by weight of the basic material is used. Best results are obtained by copolymerization temperatures within the range of from 100° to 200° F.

What is claimed is:

1. An improved process for the preparation of lubricating oil additive materials which comprises the steps of esterifying fumaric acid with a substantially saturated primary monohydric aliphatic alcohol having from 8 to 18 carbon atoms per molecule in the presence of a mild esterification catalyst selected from the group consisting of sodium acid sulfate, p-toluene sulfonic acid and phosphoric acid to form a diester, and copolymerizing about 98% to 60% by weight of said diester with about 2% to 40% by weight of vinyl acetate in an alkaline medium in the presence of a peroxide catalyst, said alkaline medium being produced by the presence of about 0.04 to 1.5 wt. percent, based on the weight of the monomers, of a compound selected from the group consisting of sodium carbonate, barium hydroxide, calcium hydroxide and sodium hydroxide.

2. A process according to claim 1 wherein said peroxide catalyst is benzoyl peroxide.

3. An improved process for the preparation of lubricating oil additive materials which comprises the steps of esterifying fumaric acid with a substantially saturated primary monohydric aliphatic alcohol having from 8 to 18 carbon atoms per molecule in the presence of a mild esterification catalyst selected from the group consisting of sodium acid sulfate, p-toluene sulfonic acid and phosphoric acid to form a diester and copolymerizing about 80% of said diester with about 20% of vinyl acetate at a temperature within a range of about 100° to 200° F. in the presence of about 0.2 to 2.0% by weight, based on the weight of the monomers, of benzoyl peroxide catalyst and in an alkaline medium produced by about 0.04 to 1.5 wt. percent, based on the weight of the monomers, of a highly alkaline inorganic compound selected from the group consisting of sodium carbonate, barium hydroxide, calcium hydroxide and sodium hydroxide.

References Cited in the file of this patent

UNITED STATES PATENTS

| | | |
|---|---|---|
| 2,410,089 | Lundquist et al. | Oct. 29, 1946 |
| 2,544,691 | Kugler et al. | Mar. 13, 1951 |
| 2,602,048 | Michaels et al. | July 1, 1952 |
| 2,666,746 | Munday et al. | Jan. 19, 1954 |
| 2,672,446 | Mixon et al. | Mar. 6, 1954 |